May 14, 1963  A. SAFFER ETAL  3,089,907
PRESSURE CONTROLLED LIQUID PHASE OXIDATION PROCESS
FOR AROMATIC ACID PRODUCTION
Filed April 21, 1958
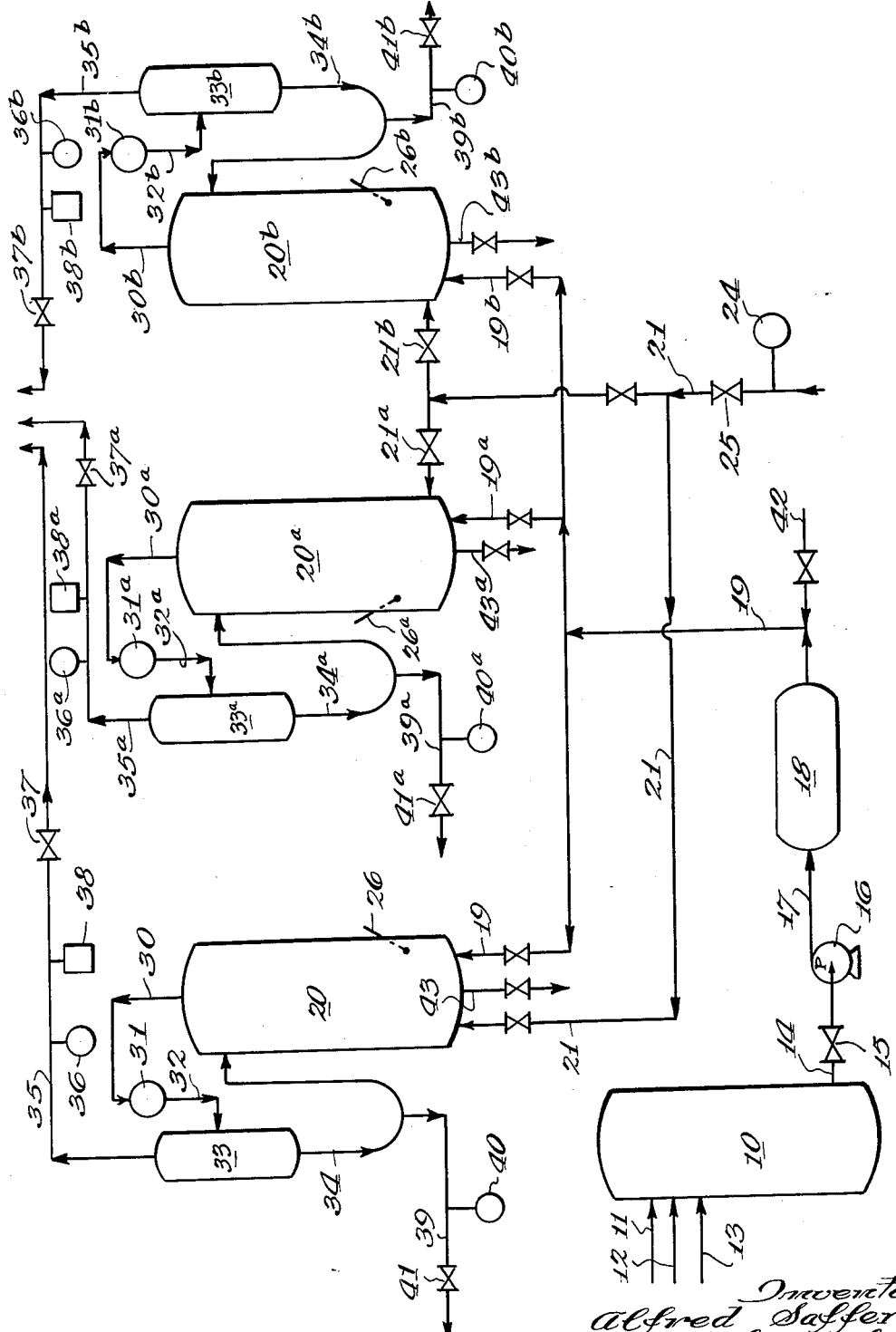
Inventors
Alfred Saffer
Robert S. Barker
By Fred R. Allen attorney United States Patent Office 3,089,907
Patented May 14, 1963

3,089,907
PRESSURE CONTROLLED LIQUID PHASE OXIDATION PROCESS FOR AROMATIC ACID PRODUCTION
Alfred Saffer, Bayside, and Robert S. Barker, Port Washington, N.Y., assignors to Mid-Century Corporation, Chicago, Ill., a corporation of Delaware
Filed Apr. 21, 1958, Ser. No. 729,977
9 Claims. (Cl. 260—524)

This invention relates to improvements in the preparation of aromatic carboxylic acids produced by the catalytic liquid phase oxidation of aromatic compounds and more particularly pertains to a process and means for the catalytic liquid phase oxidation of such aromatic compounds in the presence of a particular catalyst system at substantially constant pressure to produce aromatic carboxylic acids.

Various methods have been suggested for preparing aromatic carboxylic acids. Some of these processes employ catalytic vapor phase oxidations involving oxidation of alkyl groups attached to a benzene nucleus while others involve the splitting of one ring of a fused ring aromatic compound such as naphthalene. Other suggested methods involve the catalytic liquid phase oxidation of para-xylene or meta-xylene, methyl p-toluate or methyl m-toluate with molecular oxygen; nitric acid oxidation of xylenes; air oxidation of p-xylene to p-toluic acid and nitric acid oxidation of p-toluic acid to terephthalic acid; the preparation of ammonium phthalate mono-amide by reaction of m-xylene and ammonium sulfate and a sulfur compound at 2500 to 3000 p.s.i.g. and 570 to 660° F. plus the reaction of sulfuric acid with the mono-amide to liberate isophthalic acid; the thermal disproportionation of two moles of potassium benzoate to produce potassium terephthalate and benzene; and through the steps of reacting toluene with carbonyl chloride in the presence of a Friedel-Crafts type catalyst, saponification of the resulting toluic acid amide with caustic and chemical oxidation with potassium permanganate to form sodium potassium terephthalate. Yet none of these processes which utilize xylenes are satisfactory for the preparation of all three isomeric phthalic acids from their corresponding xylenes. Also little is known about the ability of these methods to produce other polycarboxylic acids such as the tri- and tetracarboxylic acids. Moreover, the suggested methods are not readily adaptable to use mixed polyalkyl feed stocks such as a mixture of isomeric xylenes, diethylbenzenes, diisopropylbenzenes, cymenes and the like, a mixture of isomeric trimethyl benzenes and the like.

There has been discovered a catalytic liquid phase oxidation process for the preparation of aromatic carboxylic acids by which an aliphatic substituted aromatic compound is oxidized with molecular oxygen in the presence of an inert reaction medium, preferably a lower saturated aliphatic monocarboxylic acid, i.e. containing 2 to 8 carbon atoms, and in the presence of a catalyst system containing a metal oxidation catalyst and a source of bromine. By this process the aliphatic substituent of a benzenoid ring of an aromatic, fused aromatic, or polyphenyl compound, independent of the size or conformation of the aliphatic substituent, is selectively oxidized to a COOH group attached directly to a benzenoid ring. Metal oxidation catalysts suitable for the catalyst system of this process include those providing metal cations soluble in the reaction system. The metals capable of existence in variable valence states are most desirable as the source of metal oxidation catalyst. Preferred as the source of metal oxidation catalyst in the above catalyst system are manganese, cobalt, nickel, chromium, vanadium, molybdenum, tungsten, tin, gadolinium and cerium. The metals per se can be employed or they may be employed in combined forms providing metal ions such as a manganese acetate, ammonium molybdate, cobalt hydroxy quinolate and manganese versene. The metal oxidation catalyst can be a single source of metal oxidation catalyst or a combination of metal oxidation catalysts. As a source of bromine for the catalyst system there can be employed bromine in elemental, combined or ionic form. Other than bromine itself, hydrogen bromide, ammonium bromide, potassium bromate, tetrabromoethane, benzyl bromide among other compounds soluble in the reaction medium can be employed. This catalytic liquid phase oxidation process is exceptionally efficient for the oxidation of substituted aromatic compounds to aromatic carboxylic acids containing two or more carboxy groups.

This invention relates to a method for conducting the catalytic liquid phase oxidation process employing the above catalyst system containing a metal oxidation catalyst and a source of bromine. This method is especially suitable for the use of said catalytic liquid phase oxidation process on an industrial scale for the preparation of such aromatic acids as, for example, the phthalic acids and tri-, tetra- and higher aromatic carboxylic acids. Benzoic acid and substituted benzoic acids can also be produced.

It is an object of this invention to provide a process which is satisfactory for the preparation of any individual isomeric phthalic acid alone or in admixture with any of the other isomers by the oxidation of the corresponding xylene or the simultaneous oxidation of any mixture of isomeric xylenes. Another object of this invention is to provide a process and means for oxidizing a xylene feed stock, i.e. a mixture containing predominantly xylenes but also containing mono alkyl benzenes such as ethylbenzene and toluene, and aliphatic hydrocarbons, to a mixture of aromatic acids predominantly phthalic acids but also containing some benzoic acid. Also it is an object of this invention to provide a process wherein any aromatic compound oxidizable to an aromatic carboxylic acid can be oxidized to the aromatic carboxylic acid. Another object includes providing a process and means whereby the oxidation reaction is readily carried out at substantially constant pressure. Additional objects will be apparent from the subsequent detailed description of this invention.

The objects of this invention are, in general, attained by providing in an oxidation reactor a liquid reaction mixture containing an oxidizable feed stock comprising an aromatic compound oxidizable to an aromatic carboxylic acid such as an aromatic compound containing one or more aliphatic groups oxidizable to a carboxyl group, a reaction medium comprising a monocarboxylic acid containing up to 8 carbon atoms, preferably an aliphatic acid of the acetic acid series containing 2 to 8 carbon atoms, and as a catalyst system in metal oxidation catalyst and a source of bromine; heating the liquid reaction mixture to a reaction temperature of above 140° F., a temperature in the range of 300° to 500° F. being preferred, it is also preferred to preheat the components of the reaction mixture; agitating the reaction mixture throughout the oxidation reaction mechanically and/or by the addition of the oxygen-containing gas; maintaining a substantially constant pressure sufficiently high to maintain at least a portion of the reaction mixture in the liquid phase throughout the oxidation reaction; passing a source of molecular oxygen into the liquid reaction mixture, preferably at different rates during the oxidation reaction to control in part the reaction temperature; condensing at least a portion of the materials vaporized from the reaction mixture; and withdrawing the uncondensed materials to provide a means for pressure control. It is preferred that at least a portion of the condensate be returned to the reaction mixture to aid in controlling reaction temperature and controlling the concentration of the reactants in the reaction mixture. A condensation of the vaporized materials and return of a portion of the condensate provides a means for controlling the temperature, prevents depletion of the reaction medium, and provides for removal of reaction by-products. In a continuous process there is withdrawn from the reactor a portion of the reaction medium while continuously adding the reactants and catalyst system. In a batch process all of the liquid mixture resulting from the oxidation reaction is withdrawn from the reactor. The limit on the addition of the source of molecular oxygen is, of course, determined by the amount of oxygen in the vapors in the reaction zone forming in these vapors an explosive mixture. The explosive limit on a combustible-free basis is in most cases an oxygen content of about 8 to 10% by volume.

At the end of the oxidation reaction the oxygen content of the vapors may exceed these values, especially when small scale equipment is employed, for example when air is used the oxygen content may become 20 to 21%.

It has been discovered that by the process of this invention an aromatic compound oxidizable to an aromatic carboxylic acid may be converted to the desired carboxylic acid product in one pass through a single reaction stage. The high conversion by the process of this invention does not sacrifice quality of the desired product but rather produces a product of exceptionally high quality. Advantages obtained by this invention are control of temperature, concentration of reaction medium, removal of by-products, and ease of instrumentation.

After initiation of the oxidation reaction, a high rate of oxygen feed can be utilized because of the high rate at which oxygen is consumed. This rate of oxidation of the oxidizable aromatic compound or the intermediate oxidation products to the desired carboxylic acid product is increased under conditions of an excess of oxygen. It has been discovered that the use of an excess of oxygen, that is, slightly more than is being consumed at any period during the reaction, in the process of this invention does not have a deleterious effect on aromatic carboxylic acids produced. For example, the rates of formation of undesired products such as aldehydes, alcohols and monocarboxylic acids from the feed stock; the destruction of aromatic carboxylic acids; and destruction of reaction medium do not increase as the rate of the desired reaction increases under these conditions. In general, there is little or no increase in the undesired reactions when an excess of oxyen is provided. Therefore, any limitations on the amount of excess oxygen to be employed are economic ones, being dependent on such factors as rate of oxygen consumption and the costs of reactor volume, compressed gas, etc.

The total amount of molecular oxygen added to the reaction system is, of course, dependent upon the aromatic compound being oxidized. The minimum amount of molecular oxygen added to the reaction mixture is the stoichiometric amount required to react with the aliphatic group or groups being oxidized to a COOH group or groups. For example, the stoichiometric amount of oxygen required for each methyl group oxidized is 1.5 mols of oxygen, for each ethyl group oxidized is 3.0 mols, etc. Since the liquid phase oxidation reaction is in part dependent upon the efficiency of contact between the gas and liquid as well as the rate of absorption and/or reaction of the oxygen in the liquid medium, complete utilization of the oxygen introduced is not attained throughout the entire reaction. However, under the conditions of temperature, pressure, the use of the reaction medium and the use of the catalyst system according to the process of this invention, there is a period of extremely high efficiency of absorption and utilization of the oxygen. The extent of this portion of the reaction during which there is a high rate of utilization of oxygen is dependent upon the aromatic compound being oxidized. When the rate of utilization is high, little or no unconsumed oxygen is present in the exit gas. For example, when a xylene is being oxidized with air there is little or no oxygen, 0 to 2% by volume, in the off gas for as long as about 30 to 40 minutes of a 50 to 60 minute total reaction cycle, which includes an initial period of slow addition of source of oxygen at the start and a finish-off period. The portion of the reaction cycle wherein a highly efficient use of the oxygen is also a major portion of the reaction cycle for many other of the aromatic compounds useful in the process of this invention including but not limited to tertiary-butyl xylenes, toluene, and chloro-toluene. When such compounds as pseudocumene, tetra-chloro-p-xylene, acenaphthene, mesitylene, durene and the like are oxidized, the period of extremely high, substantially complete, oxygen utilization is shorter as will be hereinafter illustrated.

The maximum rate at which the source of molecular oxygen can be added to the reaction mixture is not only governed by the rate of utilization and absorption of oxygen, but is also dependent upon such other co-related factors as the hydrostatic head in the reactor and the vapor space in the reactor. Since the process of this invention includes withdrawal of vapors from the reactor, it is important that the maximum rate of addition of molecular oxygen be at a rate below that which causes flooding of the withdrawal conduit and/or the condenser used in the removal of heat of reaction. When oxygen alone is used as the source of molecular oxygen, higher rates of gas flow can be employed than when air is employed since oxygen is only a minor proportion of the air. Another factor to be taken into consideration in arriving at the maximum input of source of moleuclar oxygen is the expansion of the reaction mixture due to the buoyancy effect of the gas introduced. Provision also must be made for the thermal expansion of the liquid reaction mixture. The combined effects of these two expansions can be illustrated with respect to the use of a vertical oxidation reactor. For example, a vertical oxidation reactor is charged with xylene and glacial acetic acid containing the metal-bromine oxidation catalyst to occupy about 0.4 of the height of the reactor at reaction temperature and pressure. Under air flow conditions providing optimum air input for this reactor the space occupied by the reaction mixture is about 0.8 of the height of the reactor leaving about 0.2 of its height for vapor space. Although these data are for a specific reactor, they will clearly indicate to those skilled in the art the effect of these expansion factors for vertical reactors. The expansion effect due to the buoyancy effect of the gas fed as a source of oxygen may not be as great when a horizontal reactor is employed and the source of molecular oxygen is so introduced as to be uniformly distributed throughout the horizontal cross sectional area of the reactor. For any specific reaction vessel the expansion effects can be readily determined and thus the maximum rates of input or full flow of air, oxygen or any other source of molecular oxygen can be determined. The limits thus determined are mechanical aspects of reactor design and are not chemical aspects of the reaction.

By full flow of air, oxygen or other source of molecular oxygen is meant the maximum rate of input of a source of molecular oxygen which provides maximum utilization of the capacity of the reactor, taking into consideration the above expansion effects, tolerable entrainment and the prevention of the formation of an explosive mixture in the vapors in the reactor as well as in the vented gas. The determination of the maximum flow rates for any specific apparatus and oxidation of a specific aromatic compound requires only the ordinary skill associated with engineering design.

It has also been found that the removal of the more volatile by-products of the oxidation will result in an increased conversion per pass, and also in an increased ultimate yield, achieving in many cases an exceptionally high yield in a single pass. An inevitable by-product of the oxidations under consideration is water, and it has been determined that the conversion and yield of the reaction are greater when the water concentration is controlled. However, a water content of from 5% up to 30% by weight of the reaction medium can be tolerated, depending on the feed being oxidized, by the process of this invention. Also, when the side chain being oxidized contains more than one carbon atom, appreciable quantities of other volatile oxidation products such as carbon dioxide and formic acid are formed. It has been discovered that the presence of formic acid may have a marked deleterious effect on conversion per pass and ultimate yield but that by the process of this invention the formic acid can be removed and/or maintained at a minimum. The removal of the more volatile by-products also provides a means for removing heat of reaction by condensing at least a portion of the less volatile materials from the vapors in the reactor, returning the condensate to the reaction medium and withdrawing the non-condensed vapors. Thus a portion of the reaction mixture is vaporized then condensed and the condensate returned to the reaction mixture, thereby providing for removing heat of reaction and maintaining the reaction within the desired temperature range. The uncondensed portion of the vapors is removed to maintain the reaction at the desired pressure. To accomplish the heat removal it is desirable to employ as the reaction medium an aliphatic acid having a boiling point below that of the aromatic compound being oxidized since the condensation of the vaporized aliphatic acid will also condense the volatilized aromatic reactant. Substantially all of the aliphatic acid can be condensed and returned to the reaction mixture even though by-product water is also condensed since the process of this invention can tolerate the presence of water.

It is fundamental that equipment that handles compressible fluids over a range of pressures will be more expensive the greater the range. This is because the equipment has to be larger to have the same mass capacity at low pressures and must be stronger to withstand the higher pressures. Therefore, a piece of equipment, such as a reactor, has to be disproportionately larger and stronger the greater the range of pressure. Thus an advantage of the process of this invention is brought about by the removal of volatile materials such as volatile by-products, at least partially as they form, thus providing for maintenance of a substantially constant pressure in the reactor and reducing the need to vary the reaction pressure because of accumulation of volatile by-products. If desirable, any reaction medium or reactant that is removed in connection with the removal of volatile materials may be replaced with additional reactant or purified reaction medium recovered in the process or may be replaced by the condensate from the withdrawn vapors. Also the need to vary the reaction pressure can be minimized by maintaining a low oxygen content in the vapors in contact with the reaction medium. This can be accomplished by decreasing the rate of addition of molecular oxygen as the rate of oxygen consumption decreases, as for example by reducing the rate of addition of the source of molecular oxygen or adding a more dilute source of molecular oxygen or reducing the rate of the original source of molecular oxygen and adding an inert diluent. In any case, the oxygen concentration in admixture with material vaporized from the reaction mixture should not exceed the explosive limit.

This invention involves the control of the oxidation process by controlling the reaction pressure within a limited degree of variation, preferably at a substantially constant pressure by removing the volatile by-products with or without varying the rate of addition of molecular oxygen during the progress of the oxidation reaction.

There are many combinations of process steps which will provide the objects of the process of this invention.

One of the preferred arrangements is shown in the accompanying diagrammatic flow sheet which forms a part of this specification and which represents a schematic diagram of the improved process of this invention. The invention will be more clearly understood from the following detailed description read in conjunction with said diagrammatic flow sheet with respect to a single reactor. The charging of ingredients to, temperature and pressure control in, removal of products from, etc., the other reactors being the same as described.

The process may be carried out by employing apparatus comprising an atmospheric blending tank 10 having inlet conduits 11, 12 and 13 for introducing the oxidizable organic compound, the reaction medium and the catalyst in the desired proportions. The reaction mixture flows through valved conduit 14 to pump 16 which forces the liquid through conduit 17, preheater 18, and valved conduit 19, into reactor 20. In this example the liquid mixture to the reactor is heated in preheater 18 to the minimum temperature at which the oxidation will be self-sustaining to reduce the size of the preheater required. The reaction mixture is permitted to increase in temperature by heat of reaction as reaction takes place until the desired reaction temperature is reached. The mixture can be preheated to the reaction temperature if desired. Alternatively, all of the heating can be accomplished in the reactor making use of a jacket, internal coils, or other indirect heat exchange devices. Also the charge can be heated within the reactor by injecting vapors that are compatible with the process such as vapors of the reaction medium or vapors of the aromatic compound to be oxidized. In addition, the charge stock (i.e. the aromatic compound to be oxidized), the reaction medium, and the catalyst can be introduced individually directly into the reactor with or without preheating of the individual streams.

Oxygen or oxygen-containing gas, such as air, air enriched with oxygen, or air diluted with inert gas, from any suitable source, such as a compressor, is furnished through valved conduit 21 to reactor 20 through conduit 21. Flow meter 24 of any suitable type, such as a rotameter, is provided to measure the instantaneous air flow rate, and valve 25 is provided to control the instantaneous air flow rate. If desired, flow meter 24 may be one of the standard flow controllers available and it may be connected to a suitable type of control valve 25 in order to maintain automatically the instantaneous air flow rate at any predetermined value. Thermometer 26 measures the reaction temperature. The thermometer can be replaced by any standard temperature indicator-controller which will close valve 25 when a predetermined maximum temperature is reached and partially closes valve 25 and/or actuate the heating of the reaction mixture when a temperature drop occurs after the major portion of the reaction is over.

The unreacted gas from and the material vaporized in reactor 20 are taken through conduit 30 to condenser 31 in which the vaporized material is condensed. The gas and liquid flow through conduit 32 to entrainment separator 33 wherein the liquid is separated from the vapor. The liquid returns to the reactor through conduit 34. The uncondensed gas is removed through conduit 35 to other processes, such as a recovery system or is discharged to the atmosphere. Pressure gage 36 is provided for determining the static pressure in the reactor, and valve 37 is provided for the purpose of regulating this pressure. If desired, pressure gage 36 may be one of the standard pressure controllers available, and it may be connected to a suitable type of control valve 37 in order to maintain automatically the static pressure at a predetermined value. Gas analyzer 38 is provided in order to determine the oxygen concentration in the vent gas stream and may be a continuous oxygen analyzer connected to shut off the source of oxygen to reactor 20 when the oxygen in the gas stream reaches a predetermined value.

A portion of the condensate may be removed through conduit 39 in order to remove volatile by-products. Flow meter 40 which may be of the instantaneous or integrating type is provided to measure the amount withdrawn and valve 41 is used to control the amount withdrawn. Conduit 42 is provided to introduce reaction medium to replace that withdrawn through conduit 39. The material in the reactor is removed as required through conduit 43 for recovery of products, unreacted raw materials, intermediates, catalyst, and reaction medium.

By various well known design features, condenser 31 can be made so that adequate separation of gas and condensate takes place therein and entrainment separator 33 may be eliminated. Further, the condenser may be attached directly to reactor 20, as for example an internal condenser in order to eliminate conduits 30, 32 and 34. In this event, the removal of volatile by-products may be accomplished by limiting the cooling in the condenser so that the portion of the condensible vapors desired to be removed are removed uncondensed with the non-condensible gas. These condensible vapors can then be recovered by any suitable means that does not return them to the reactor.

It will be obvious to one skilled in the art that condenser 31 does not have to operate cold enough to achieve complete condensation of the material vaporized from the reactor. In this case the uncondensed materials can be recovered, if desired, by any one of several means, among which are absorption, adsorption and chemical reaction, not shown. Such procedures are known to the art, and neither their omission nor their inclusion are critical to this process. Any reaction medium, catalyst or reactants lost in this fashion can be compensated for in the preparation of the initial charge or can be added as make-up during the progress of the oxidation.

The source of oxygen is started at a low rate when the reactants are first heated to a temperature which will just sustain reaction. Thereafter oxygen is added at the highest rate at which there will be no flooding of the equipment with entrained liquid or at just below the rate at which the oxygen in the vapor space is below that providing an explosive mixture. In many cases, the reaction temperature drops when the major portion of the reaction is over and the rate of oxygen addition is reduced and heat added to maintain the reaction at a desired temperature. The preferred rate of oxygen addition is that which will prevent excessive volatilization and cooling of the reaction mixture and thus keep the heat input at a minimum. Also the reduced rate of oxygen addition should not provide an $O_2$ content in the vapors above about 8 to 10% by volume.

It will be apparent to anyone skilled in the art that other types of apparatus can be used equally successfully. The use of specific apparatus or combinations of specific apparatus is not critical to the process of this invention, but rather the procedural steps and process conditions are critical. Hence any apparatus which will provide the procedural steps and process conditions will be suitable for the process of this invention.

It is also apparent that the process of this invention can be operated either as a batch, an intermittent batch or as a continuous process by means of recognizable variations in the apparatus and the use thereof.

It does not change the principles of the process if a multiplicity of reactors are used with the liquid contents proceeding sequentially from one to another until the desired degree of completion of the reaction and/or conversion of the reactants is achieved and the liquid is sent to recovery apparatus. Although the accompanying diagrammatic flow sheet does not show the necessary conduits from one reactor to another and means for controlling the flow of the effluent from one reactor to another, it will be readily understood that the effluent from reactor 20 containing the partially oxidized charge stock can be removed through conduit 43 and charged to reactor 20a say through conduit 19a and the effluent from reactor 20a can be withdrawn through conduit 43a and charged to reactor 20b say through conduit 19b. In such a process, the reaction temperature, pressure, oxygen concentrations in the source of oxygen and vent gases, volatile by-products removal from each reactor can be varied from reactor to reactor in order to approach the conditions of the process of this invention for the corresponding period in a single batch reactor.

The process of this invention, as hereinbefore described, can be carried out batchwise in a single reactor, or batchwise simultaneously in two or more reactors or in an intermittent batchwise system wherein the reaction cycles of each reactor are scheduled to make use of the continuous full capacity of the compressor supplying the molecular oxygen. To illustrate such an intermittent batchwise process it is necessary to determine the reaction time and to determine the "down time" or "off stream time" which will include time for discharging and washing a reactor as well as placing it back in operation. For a reaction of two hours duration and a "down time" of one hour there would be required three reactors such as reactors 20, 20a and 20b. Where the reaction time and "down time" are substantially equal only two reactors are required. It will be understood that the process of this invention is not limited to this number of reactors in an intermittent batchwise process for these conditions and number of reactors are intended to illustrate only a specific reaction situation included in the broad concept of the disclosed invention.

In carrying out such a specific intermittent batchwise process using three reactors there would first be charged, for example, reactor 20 and the process hereinbefore described in detail would be carried out. Then reactor 20a would be made ready so that, when one-half of the reaction cycle of reactor 20 had been completed, the oxidation reaction in reactor 20a can be started. Similarly, when one-half of the oxidation reaction cycle of reactor 20a was reached, the oxidation in reactor 20b can be started while reactor 20 is being emptied. Thus two reactors are always on stream. Such an intermittent batch process will supply a more uniform rate of reaction product per day and, when the reactors are discharged into a common surge tank, the mixture containing the desired aromatic acids can be continuously processed to recover the aromatic acid products and the reaction medium.

The process of this invention is applicable to the catalytic liquid phase oxidation of a wide variety of aliphatic substituted aromatic compounds. For example, terephthalic (para) acid may be obtained by the oxidation of any 1,4-dialkyl benzene, for example 1-methyl-4-ethylbenzene, 1-methyl-4-isopropylbenzene (p-cymene), 1,4-diisopropylbenzene, or 1-ethyl-4-n-butyl benzene. Other aliphatic substituted aromatic compounds which may be oxidized to aromatic carboxylic acids and the products obtained thereby are: alkyl aromatics as toluene, the xylenes, pseudo-cumene, durene, mesitylene, hemimellitene, di-tert-butyl benzene, m-diisopropylbenzene, m-cymene, m-tert-butyl cumene, and o-amyl toluene to the corresponding aromatic mono- or poly-carboxylic acid or alkylaromatic carboxylic acid; alkenyl aromatics as styrene, and alkyl-vinyl benzenes to aromatic carboxylic acids; fused-ring aromatics as acenaphthene to naphthalic acid, methyl naphthalene to naphthoic acid, and phenanthrene (the central ring behaving as an aliphatic substituent) to diphenic acid; naturally occuring fused-ring aromatics as coal to mixed aromatic polycarboxylic acids, and wood charcoal to humic acid and mixed aromatic polycarboxylic acids; diphenyl-type compounds as ditolylethane to isophthalic and terephthalic acids; aromatics containing oxygenated substituents as toluic acids to phthalic acids, acetophenone to benzoic acid, and cumic acid, hydroxycumic acid, alpha-alpha'-dihydroxy-diisopropylbenzene, p-diacetyl benzene, and p-tolualdehyde to terephthalic acid; substituted alkyl-aromatics as p-toluene sulfonic acid to p-sulfobenzoic acid, p-nitrotoluene to p-nitrobenzoic acid, p-tolunitrile to terephthalic acid, chloro-p-xylene to chloroterephthalic acid, and p-chlortoluene to p-chlorbenzoic acid.

The process of this invention is illustrated by the following specific examples.

EXAMPLE I

In a corrosion resistant reactor 20 purged of air with nitrogen there is provided a reaction mixture containing 8,160 parts by weight of a mixed xylene (about 85% ortho-, 9.0% meta- 4.0% para-xylene, and 2.0% ethylbenzene), 16,320 parts by weight of acetic acid and 132 parts by weight of manganese bromide at a temperature of 350° F. Valve 37 is adjusted to maintain a pressure in the reactor of 370 p.s.i.g. Air at 400 p.s.i.g. is passed into the reaction mixture slowly to provide sufficient heat of reaction until the reaction mixture is heated to 400° F. Thereafter full flow of air at 400 p.s.i.g. is added to provide an exit gas containing not more than 2% oxygen by volume. Generally under these conditions the oxygen concentration in the gas at analyzer 38 will be 0 to 2% by volume at an air flow just below that which would flood the vapor space with entrained liquid. Condenser 31 is operated so that the condensed gases leave at a temperature of about 120 to 125° F. The vaporized acetic acid, the xylene and the water produced by the oxidation reaction are condensed and returned to the reaction mixture. In this manner the reaction temperature is maintained at about 400° F. for about 30 minutes, whereupon the reaction temperature drops to about 380° F. and the oxygen content of the gas measured by analyzer 38 increases to about 2 to 4% by volume. At this time the rate of air addition is decreased so that the reaction temperature can increase again to 400° F. by heating the reaction mixture with heat from an external source. This lower rate of air feed is maintained until the oxygen content of the gas measured by analyzer 38 increases to about 6%. The supply of air is then shut off and an inert gas such as nitrogen is charged into the reaction to sweep oxygen out of the reactor. During the time of decreased air input the amount of materials vaporized and consequently the amount of condensate returning to the reaction mixture is also diminished. The heat added is just sufficient to maintain the desired reaction temperature.

After the air has been shut off a portion of the pressure in the reactor is released and vapors are removed to cool the reaction mixture to about 300° F. The resulting cooled reaction mixture is discharged to a receiving tank and the mixture is treated to recover individual isomeric phthalic acid products and benzoic acid. From this process there is recoverable an overall phthalic acid product representing a 109 weight percent yield based on the xylene content of the feed stock and about 110 weight percent yield of benzoic acid based on ethylbenzene. A terephthalic acid product of 95% purity (5% isophthalic acid) is recoverable in an amount of about 360 parts by weight, an isophthalic acid product of about 1050 parts by weight of 89% purity (11% terephthalic acid) and about 7520 parts by weight of ortho-phthalic acid of 98% purity. The benzoic acid is substantially pure.

EXAMPLE II

In a vertical corrosion resistant reactor 20, four inches in diameter purged of air there is provided a reaction mixture containing 7000 parts by weight of a xylene containing 98% para-xylene (the remaining 2% being mainly meta-xylene), 10,100 parts by weight of acetic acid, 57 parts by weight of a mixture of manganese acetate and cobalt acetate and 19 parts by weight tetra-bromoethane heated to 390° F. Valve 37 is adjusted to maintain a pressure of 325 p.s.i.g. Air at just above 325 p.s.i.g. is provided at a rate giving about 13 standard cubic feet of exit gas per minute for 3 minutes and the temperature of the reacants increases to 422° F. Air rate is increased to give 23.3 standard cubic feet of exit gas per minute (oxygen content 0 to 3%) and the reaction temperature remains substantially constant at 400° F. During the air addition substantially all of the acetic acid vaporized is condensed in condenser 31 and is returned to the reaction mixture to maintain the reaction temperature. After about 20 minutes of reaction the air flow is reduced to maintain the reaction temperature at 400° F. The process is continued at reduced air flow until the oxygen content of the gas at analyzer 38 reaches about 5.2%, a total reaction time of 35 minutes, the flow of air is stopped and the reactor flushed with an inert gas to remove oxygen.

The resulting reaction mixture containing the phthalic acid is withdrawn at 360° F. to a receiver, cooled to about 200° F. and filtered. The solid recovered is washed with acetic acid and dried. In this manner a 125 weight percent yield of terephthalic acid is obtained.

EXAMPLE III

The procedure of Example II is repeated except the following materials are charged on a part by weight basis:

| | Parts |
|---|---|
| meta-Xylene (97% meta) | 6,000 |
| Acetic acid (100%) | 13,500 |
| Tetrabromoethane | 15.8 |
| Mixture of cobalt and manganese acetates | 47.3 |

The reaction mixture is heated to 380° F. and the pressure is set at 325 p.s.i.g. Air is fed slowly for about five minutes to give an exit gas flow of about 4 standard cubic feet per minute. Thereafter the air input is increased to give an exit gas flow of about 42 standard cubic feet per minute. The reaction temperature is maintained in the range of 410 to 425° F. for about 20 minutes. Thereafter the air rate is gradually decreased to maintain an exit gas flow of about 5 standard cubic feet per minute. When the oxidation is substantially complete, total reaction time of 35 minutes, the air is shut off and the reactor contents are cooled to 384° F. by removal of some of the vapor to remove the oxygen-containing gases. The reactor contents are discharged at 384° F., cooled to 140° F. and centrifuged to recover isophthalic acid. A 138 weight percent yield of isophthalic acid of acid number 671 (theory 675) is obtained.

EXAMPLE IV

The procedure of Example II is repeated except the following materials are charged on a part by weight basis:

| | Parts |
|---|---|
| ortho-Xylene (92.4% ortho-, 5.9% meta-, 0.4% para- and 0.9% ethylbenzene) | 7,000 |
| Acetic acid (100%) | 14,000 |
| Mixture manganese and cobalt acetates | 175 |
| Tetrabromoethane | 18 |

The reaction mixture is heated to 400° F. and the pressure is set at 325 p.s.i.g. The air input for the first five minutes provides an exit gas flow of 13 standard cubic feet per minute, for the next 15 minutes an exit gas flow of 19 standard cubic feet per minute (oxygen content 0 to 0.6%) and thereafter the air flow is gradually decreased to maintain a reaction temperature of about 410° F. for 20 minutes and 370° to 395° F. for the next 10 minutes (a total reaction time of about one hour) at which time the oxygen content in the exit gas rises sharply and the air is shut off. The oxygen-containing gases are withdrawn from the reactor and the temperature of the reactor contents is decreased to 325° F. The partially cooled reactor contents are discharged, cooled to 100° F. and centrifuged. The ortho-phthalic acid content of the solid product recovered indicates an ortho-phthalic acid yield of 111 weight percent based on the ortho-xylene charged. The mother liquor recovered contains ortho-phthalic acid which can be recovered by first distilling off wet acetic acid, benzoic acid and phthalic anhydride. An additional yield of ortho-phthalic acid amounting to 20 weight percent is recovered in this manner as its anhydride.

EXAMPLE V

A process is conducted in an apparatus having in combination a corrosion-resistant pressure oxidation reactor and a water-cooled condenser mounted above the reactor. The reactor section is wound with nichrome ribbon to a height of about ⅓ the reactor height. When the oxidation is in progress, air under pressure is admitted to the reactor through a gas distributor located just above the bottom, and the upper end of the condenser is sealed. Vent gases exit through a tube at the top of the condenser and pass through a needle control valve; a mercury-in-glass flow meter and a dry ice trap prior to venting to the atmosphere. The reactor is charged by adding weighed amounts of each reactant through the top of the condenser, which is then closed and the reactor pressure raised to about 400 p.s.i.g. with air. Thus the reactor is charged with 75 parts of 95% p-xylene, 150 parts of acetic acid, one part of manganese acetate tetrahydrate and 0.75 part of ammonium bromide. The pressure is set at 400 p.s.i.g. and the reactor section heated to 385° F. The exit control valve is adjusted so that the flow rate of gas through the exit flowmeter is 3,000 volumes/hour/volume of reaction mixture. When the temperature reaches 385° F., the external heating is halted and the temperature rises because of the exothermicity of the reaction. After the initial reaction, external heat is applied to maintain a reaction temperature of 385–400° F. for a total of 1.5 hours. Upon completion of the reaction, as shown by 20–21% oxygen content (Orsat gas analysis) of the exit gas, the reactor is allowed to cool to 185° F. and depressured. The liquid products are removed at 150–200° F. by applying back pressure from a nitrogen cylinder through the condenser. The reactor liquid is drained by opening a union in the air feed line. The bottom flange is removed and the solid product scraped from the reactor section. The solid and liquid products are combined and filtered. The insoluble terephthalic acid residue is washed twice with 75 mls. of hot acetic acid and dried. A weight yield of 115% terephthalic acid is obtained (acid number 672, theory 675).

EXAMPLE VI

The procedure of Example II is repeated except there is charged on a part by weight basis:

| | Parts |
|---|---|
| Pseudocumene | 6,000 |
| Acetic acid | 18,000 |
| Mixture of cobalt and manganese acetates | 900 |
| Tetrabromoethane | 36 |

The pressure is set at 350 p.s.i.g. and the reaction mixture is heated to 375° F. Air flow for the first five minutes is provided giving an exit gas flow of about 4 standard cubic feet per minute. Thereafter the air input is increased to provide an exit gas flow of 13 to 19 standard cubic feet per minute (oxygen content 0.0 to 0.4%) for the next 25 minutes and a reaction temperature of 428° to 432° F. Thereafter the air input is decreased gradually for 30 minutes (total time 60 minutes) until the exit gas flow is about 5 standard cubic feet per minute (oxygen content 0%) to maintain the reaction temperature in the range of 428° to 432° F. The air flow is maintained at this last rate for an additional 120 minutes and heat is added to maintain a reaction temperature of about 428° F. When the oxygen content of the exit gas rises sharply the air is shut off, heating is stopped, oxygen-containing gas is withdrawn and the reactor contents are cooled to 275° F. The resulting mixture was cooled to 140° F. and centrifuged. The dried recovered solid represents a yield of trimellitic acid of 100 weight percent yield having an acid number of 775. Additional trimellitic acid is recovered from the mother liquor. In this process the first appreciable oxygen increase in the exit gas appears after about 90 minutes of operation and increases steadily thereafter for the remainder of the reaction.

EXAMPLES VII to IX

In processes similar to those of Examples II and III there is oxidized symmetrical tertiary butyl xylene (alkyl groups in the 1, 3, 5 position), tetra-chloro-p-xylene and durene in the presence of a heavy metal oxidation catalyst and a source of bromine employing a saturated aliphatic monocarboxylic acid as the reaction medium. Each process was carried out at a constant pressure. After the temperature drop the flow of air was decreased and heat added to maintain the reaction temperature. The reaction temperature pressure, rate of air flow at full rate, time in minutes to reach the temperature drop, percent of theoretical oxygen consumption at the temperature drop and the product produced is set forth in Table I.

*Table I*

| Example No. | Aromatic Feed | Temp., °F. | Press., p.s.i.g. | Air, l./min. | Time to Temp. Drop | Oxygen Consumed, Percent of Theory | Product |
|---|---|---|---|---|---|---|---|
| VI | t-Bu m-xylene | 375 | 300 | 6.2 | 30 | 86 | t-Bu-Isophthalic Acid. |
| VII | tetra-Chloro-p-xylene | 400 | 400 | 6.7 | 18 | 62 | tetra-Chloro Terephthalic Acid. |
| VIII | Durene | 365 | 300 | 6.5 | 37 | 55 | Mixture of di-, tri- and tetra-Carboxyl Benzenes. |

EXAMPLE IX p-Toluic acid is oxidized to terephthalic acid by a process similar to that in the above examples. The reaction mixture contains 68 parts by weight p-toluic acid, 210 parts by weight acetic acid, 0.14 parts by weight ammonium bromide, and 0.43 part by weight of a mixture of cobalt and manganese acetates. The mixture is heated to 400° F. and the pressure is set at 350 p.s.i.g. Air at an average flow providing an exit gas flow of about 4 standard liters per minute is maintained for about 90 minutes, a rate which provides no more than 0–2% oxygen in the exit gas until the oxidation is substantially complete. Acetic acid is condensed from the vapors in the reactor and returned to the reaction mixture. The addition of air is stopped when the gas at analyzer 38 indicates a sharp rise in oxygen content. The reactor contents are withdrawn, and the terephthalic acid so produced is recovered as in Example II. In this manner a yield of terephthalic acid of 107 weight percent based on toluic acid is produced with an acid number of 670.

The process of this invention can be carried out employing other metal oxidation catalysts and other sources of bromine to form a catalyst system. Such catalyst systems are disclosed in co-pending application Serial No. 530,401, now U.S. Patent No. 2,833,816. In general, the amount of catalyst to be employed in the reaction system will be a catalyst system which provides an amount of metal and an amount of bromine in the range of from about 0.1 to 10% by weight or more based on the aromatic reactants charged, caculated on the basis of a metal bromide. For example, when a manganese carboxylate such as manganese acetate is employed together with a source of bromine as the catalyst system, the amount of manganese acetate and the amount of bromine may be employed in the range of the equivalents of manganese and bromine in manganese bromide. However, the mixtures of the source of metal and the source of bromine may be varied and need not be present in stoichiometric proportions represented by the metal bromide. For example, the catalyst system may contain from 1 to 7 atoms of metal per atom of bromine or from 1 to 10 atoms of bromine per atom of metal.

The process of this invention can be employed to prepare the other aromatic carboxylic acids hereinbefore disclosed from the aromatic compounds indicated or other precursors of the aromatic carboxylic acids. The process of this invention is not limited to the use of acetic acid as the reaction medium, for such other lower aliphatic monocarboxylic acids as the propionic acids, butyric acids, valeric acids, caproic acids and caprylic acids can be substituted in the processes described in Examples I to IX without interfering wtih the production of the desired aromatic carboxylic acids. When such aliphatic acids are employed in the place of acetic acid and the aromatic compound being oxidized boils lower than the aliphatic acid, the refluxing of the aromatic compound and water provides for the removal of heat of reaction as does the refluxing of acetic acid and water. Thus the use of these acids as the reaction medium does not change the procedural step of temperature control during the process.

This application is a continuation in part of our copending application Serial No. 530,401 filed August 24, 1955, now U.S. Patent No. 2,833,816.

What is claimed is:

1. In the preparation of an aromatic carboxylic acid from an aliphatic substituted aromatic compound by oxidizing with molecular oxygen in the presence of a catalyst system comprising a metal oxidation catalyst and a source of bromine said oxidation being conducted under liquid phase conditions in the presence of an alkanoic acid containing from 2 to 8 carbon atoms per molecule as the reaction medium, the improvement of effecting said oxidation by providing in a reactor at a temperature above 140° F and at least at a pressure to maintain a liquid phase in said reactor of a liquid reaction mixture containing said aliphatic substituted aromatic compound, said catalyst system and said reaction medium; passing a source of molecular oxygen into said reaction mixture slowly to initiate the oxidation at a temperature in the range of 140–300° F., increasing the rate of addition of molecular oxygen into the reaction mixture to the maximum rate for oxidation at a temperature in the range of from 300–500° F. until the reaction temperature begins to decrease and thereafter reducing the rate of addition of molecular oxygen; condensing at least a portion of the materials vaporized from the reaction mixture; returning to the reaction mixture at least a portion of the condensate; and removing a portion of the uncondensed vapors to maintain a substantially constant pressure in said reactor.

2. In the preparation of an aromatic carboxylic acid from an aliphatic substituted aromatic compound by oxidizing with molecular oxygen in the presence of a catalyst system comprising a metal oxidation catalyst and a source of bromine said oxidation being conducted under liquid phase conditions in the presence of an alkanoic acid containing from 2 to 8 carbon atoms per molecule as the reaction medium, the improvement of effecting said oxidation by providing in an oxidation reactor a liquid reaction mixture containing said aliphatic substituted aromatic compound, said catalyst system and said reaction medium at the minimum temperature at which at least an initial portion of the oxidation reaction is self-sustaining and at a pressure to maintain a liquid phase of the reaction mixture; passing a source of molecular oxygen into said reaction mixture slowly and permitting the heat of reaction to increase the temperature of the reaction mixture to a temperature in the range of from 300 to 500° F.; thereafter increasing the rate of addition of molecular oxygen into the reaction mixture to the maximum rate until the reaction temperature begins to decrease; thereafter reducing the rate of addition of molecular oxygen; wherein during the oxidation reaction a portion of the materials vaporized from the reaction mixture is condensed, the condensate is returned to the reaction mixture and the uncondensed vapors are removed to maintain a substantially constant pressure and wherein during all periods of addition of molecular oxygen the oxygen concentration in the vapors is maintained to not exceed 8 to 10% by volume.

3. In the preparation of phthalic acid from an alkyl substituted aromatic compound by oxidizing with molecular oxygen in the presence of a catalyst system comprising a metal oxidation catalyst and a source of bromine said oxidation being conducted under liquid phase conditions in the presence of an alkanoic acid containing from 2 to 8 carbon atoms per molecule as the reaction medium, the improvement of effecting said oxidation by providing in a reactor at a temperature above 140° F. and at least at a pressure to maintain a liquid phase of the liquid reaction mixture containing said alkyl substituted aromatic compound, said catalyst system and said reaction medium; passing a source of molecular oxygen into said reaction mixture slowly to initiate the oxidation at a temperature in the range of 140–300° F., increasing the rate of addition of molecular oxygen into the reaction mixture to the maximum rate for oxidation at a temperature in the range of from 300–500° F. until the reaction temperature begins to decrease and thereafter reducing the rate of addition of molecular oxygen; condensing a portion of the materials vaporized from the reaction mixture; returning the condensate to the reaction mixture; and removing the uncondensed vapors to maintain a substantially constant pressure in said reactor.

4. In the preparation of a phthalic acid from a xylene by oxidizing with molecular oxygen in the presence of a catalyst system comprising a metal oxidation catalyst and a source of bromine said oxidation being conducted under liquid phase conditions in the presence of acetic acid as the reaction medium, the improvement of effecting said oxidation by providing in a reactor at a temperature above 140° F. and at least at a pressure to maintain a liquid phase of the reaction mixture containing xylene acetic acid and said catalyst system; passing a source of molecular oxygen into said reaction mixture slowly to initiate the oxidation at a temperature in the range of 140–300° F., increasing the rate of addition of molecular oxygen into the reaction mixture to the maximum rate for oxidation at a temperature in the range of from 300–500° F. until the reaction temperature begins to decrease and thereafter reducing the rate of addition of molecular oxygen; removing a portion of the vapors from the reactor; condensing acetic acid from these vapors; and returning the acetic acid condensate to the reactor.

5. In the preparation of a phthalic acid from a xylene by oxidizing with molecular oxygen in the presence of a catalyst system comprising a metal oxidation catalyst and a source of bromine said oxidation being conducted under liquid phase conditions in the presence of acetic acid as the reaction medium, the improvement of effecting said oxidation by providing in a reactor at a temperature above 140° F. and at least at a pressure to maintain a liquid phase of the reaction mixture containing xylene, acetic acid and said catalyst system; passing a source of molecular oxygen into said reaction mixture slowly to initiate the oxidation at a temperature in the range of 140–300° F., increasing the rate of addition of molecular oxygen into the reaction mixture to the maximum rate for oxidation at a temperature in the range of from 300–500° F. until the reaction temperature begins to decrease and thereafter reducing the rate of addition of molecular oxygen; condensing acetic acid from the vapors in the reactor; returning the condensate to the reaction mixture; and withdrawing the uncondensed vapors to maintain a substantially constant pressure.

6. In the preparation of a phthalic acid from a xylene by oxidizing with molecular oxygen in the presence of a catalyst system comprising a metal oxidation catalyst and a source of bromine said oxidation being conducted under liquid phase conditions in the presence of acetic acid as the reaction medium, the improvement of effecting said oxidation by providing in a reactor at a temperature above 140° F. and at least at a pressure to maintain a liquid phase of the reaction mixture containing xylene, acetic acid and said catalyst system; passing a source of molecular oxygen into said reaction mixture slowly to initiate the oxidation at a temperature in the range of 140–300° F., increasing the rate of addition of molecular oxygen into the reaction mixture to the maximum rate for oxidation at a temperature in the range of from 300–500° F. until the reaction temperature begins to decrease and thereafter reducing the rate of addition of molecular oxygen; withdrawing a portion of the vapors from the reactor to maintain a substantially constant pressure; condensing acetic acid and materials less volatile than acetic acid from the withdrawn vapors; and returning the condensate to the reactor.

7. In the preparation of a phthalic acid from a xylene by oxidizing with air in the presence of a catalyst system comprising a metal oxidation catalyst and a source of bromine said oxidation being conducted under liquid phase conditions in the presence of acetic acid as the reaction medium, the improvement of effecting said oxidation by providing in a reactor at a temperature of from 300 to 500° F. and at least at a pressure to maintain a liquid phase of the reaction mixture containing xylene, acetic acid and said catalyst system; passing air into said reaction mixture slowly to initiate the oxidation at a temperature in the range of 300–500° F. and thereafter increasing the rate of addition of air into the reaction mixture to the maximum rate for oxidation at a temperature in the range of from 300–500° F.; withdrawing a portion of the vapors from the reactor to maintain a substantially constant pressure; condensing acetic acid and materials less volatile than acetic acid from the withdrawn vapors; returning the condensate to the reactor and decreasing the rate of addition of air when the reaction temperature decreases, wherein said process during the addition of air the oxygen concentration in the vapors is maintained to not exceed 8 to 10% by volume.

8. In the preparation of a phthalic acid by the oxidation of a xylene with air in the presence of acetic acid as the reaction medium and in the presence of a catalyst system comprising a manganese oxidation catalyst and a source of bromine at a pressure to maintain a liquid phase, the improvement of providing in a reactor xylene, acetic acid and said catalyst system at a temperature of about 350 to 360° F. and at a pressure in the range of 300 to 400 pounds per square inch, passing air into said reaction mixture slowly without removal of heat of reaction until the reaction mixture reaches a temperature not exceeding about 450° F.; thereafter increasing the rate of addition of air to the maximum rate until a decrease in reaction temperature occurs and thereafter decreasing the rate of addition of air until the oxidation reaction is substantially complete; wherein said process a substantially constant pressure is maintained during the oxidation reaction by withdrawing vapors from the reactor; condensing therefrom acetic acid and materials less volatile than acetic acid; and returning the condensate to the reactor; and wherein said process during the addition of air the oxygen concentration in the vapors is maintained to not exceed 8 to 10% by volume.

9. In the preparation of an aromatic carboxylic acid from an aliphatic substituted aromatic compound by oxidizing with molecular oxygen in the presence of a catalyst system comprising a metal oxidation catalyst and a source of bromine said oxidation being conducted under liquid phase conditions in the presence of an alkanoic acid containing from 2 to 8 carbon atoms per molecule as the reaction medium, the improvement of effecting said oxidation by providing in a reactor at a temperature above 140° F. and at least at a pressure to maintain a liquid phase of the liquid reaction mixture containing said aliphatic substituted aromatic compound, said catalyst system and said reaction medium; passing a source of molecular oxygen into said reaction mixture slowly to initiate the oxidation at a temperature in the range of 140–300° F. until the reaction temperature begins to decrease and thereafter reducing the rate of addition of molecular oxygen; maintaining a substantially constant reaction pressure by removing from the reactor vapors which are substantially free of vapors of the reaction medium; and adding heat to the reaction mixture when the reaction temperature decreases, wherein said process during the addition of molecular oxygen the oxygen concentration in the vapors is maintained to not exceed 8 to 10% by volume.

References Cited in the file of this patent

UNITED STATES PATENTS

| | | |
|---|---|---|
| 2,746,990 | Fortuin et al. | May 22, 1956 |
| 2,833,816 | Saffer et al. | May 6, 1958 |
| 2,860,162 | Ekenstam | Nov. 11, 1958 |
| 2,887,511 | Wasley | May 19, 1959 |
| 2,890,245 | Bonnett | June 9, 1959 |

FOREIGN PATENTS

| | | |
|---|---|---|
| 623,836 | Great Britain | May 24, 1949 |
| 680,571 | Great Britain | Oct. 8, 1952 |